US008484827B2

(12) United States Patent
Faatz et al.

(10) Patent No.: US 8,484,827 B2
(45) Date of Patent: Jul. 16, 2013

(54) METHOD OF ASSEMBLING A DRILLING AND/OR HAMMERING TOOL

(75) Inventors: Heinz-Werner Faatz, Schmitten (DE); Thomas Stanke, Idstein (DE); Ernst Staas, Limburg (DE); Robert Wache, Wiesbaden (DE); Rosie Wache, legal representative, Wiesbaden (DE)

(73) Assignee: Black & Decker Inc., Newark, DE (US)

( * ) Notice: Subject to any disclaimer, the term of this patent is extended or adjusted under 35 U.S.C. 154(b) by 1195 days.

(21) Appl. No.: 11/958,064

(22) Filed: Dec. 17, 2007

(65) Prior Publication Data

US 2008/0092363 A1 Apr. 24, 2008

Related U.S. Application Data

(62) Division of application No. 10/359,423, filed on Feb. 6, 2003, now Pat. No. 7,308,950.

(30) Foreign Application Priority Data

Feb. 8, 2002 (GB) .................................. 0202956.9

(51) Int. Cl.
*H02K 15/00* (2006.01)

(52) U.S. Cl.
USPC .................. 29/596; 29/597; 29/598; 173/217

(58) Field of Classification Search
USPC ................. 29/596–596; 310/47, 50; 173/217, 173/117, 170
See application file for complete search history.

(56) References Cited

U.S. PATENT DOCUMENTS

| | | | | |
|---|---|---|---|---|
| 3,456,740 | A * | 7/1969 | Helmut et al. | 173/109 |
| 5,052,497 | A * | 10/1991 | Houben et al. | 173/109 |
| 6,123,158 | A * | 9/2000 | Steffen | 173/217 |
| 6,127,751 | A * | 10/2000 | Kristen et al. | 310/50 |
| 6,543,549 | B1 * | 4/2003 | Riedl et al. | 173/216 |
| 6,609,860 | B2 * | 8/2003 | Wanek et al. | 408/14 |
| 6,763,897 | B2 * | 7/2004 | Hanke et al. | 173/210 |
| 7,308,950 | B2 * | 12/2007 | Faatz et al. | 173/217 |

* cited by examiner

*Primary Examiner* — Minh Trinh
(74) *Attorney, Agent, or Firm* — Kofi Schulterbrandt; Scott B. Markow; Adab Ayala

(57) ABSTRACT

A method of assembling a hand held electrically powered drilling and/or hammering tool having a tool housing and a drilling and/or hammering spindle mounted within the housing. The spindle has a forward end at which a tool or bit may be mounted. The method of assembly includes the steps of making a motor sub-assembly including a motor and a radial fan, the fan has a plurality of blades located on one side of the fan and non-rotatably mounting the fan on an end of the armature shaft of the motor at a first end of the motor with the blades facing away from the armature of the motor. The method further including balancing the motor sub-assembly, and mounting the sub-assembly within the housing, with the longitudinal axis of the motor armature shaft at an angle, preferably perpendicular to the longitudinal axis of the spindle and with the first end of the motor closest to the spindle axis. Thus, in use of the tool, the fan rotates at the first end of the motor to draw air into its inlet via air inlets in the housing and so as to push air through the motor and out of air outlets in the housing in the region of the second end of the motor which is remote from the spindle axis. A drilling and/or hammering tool made according to the method is also described.

6 Claims, 1 Drawing Sheet

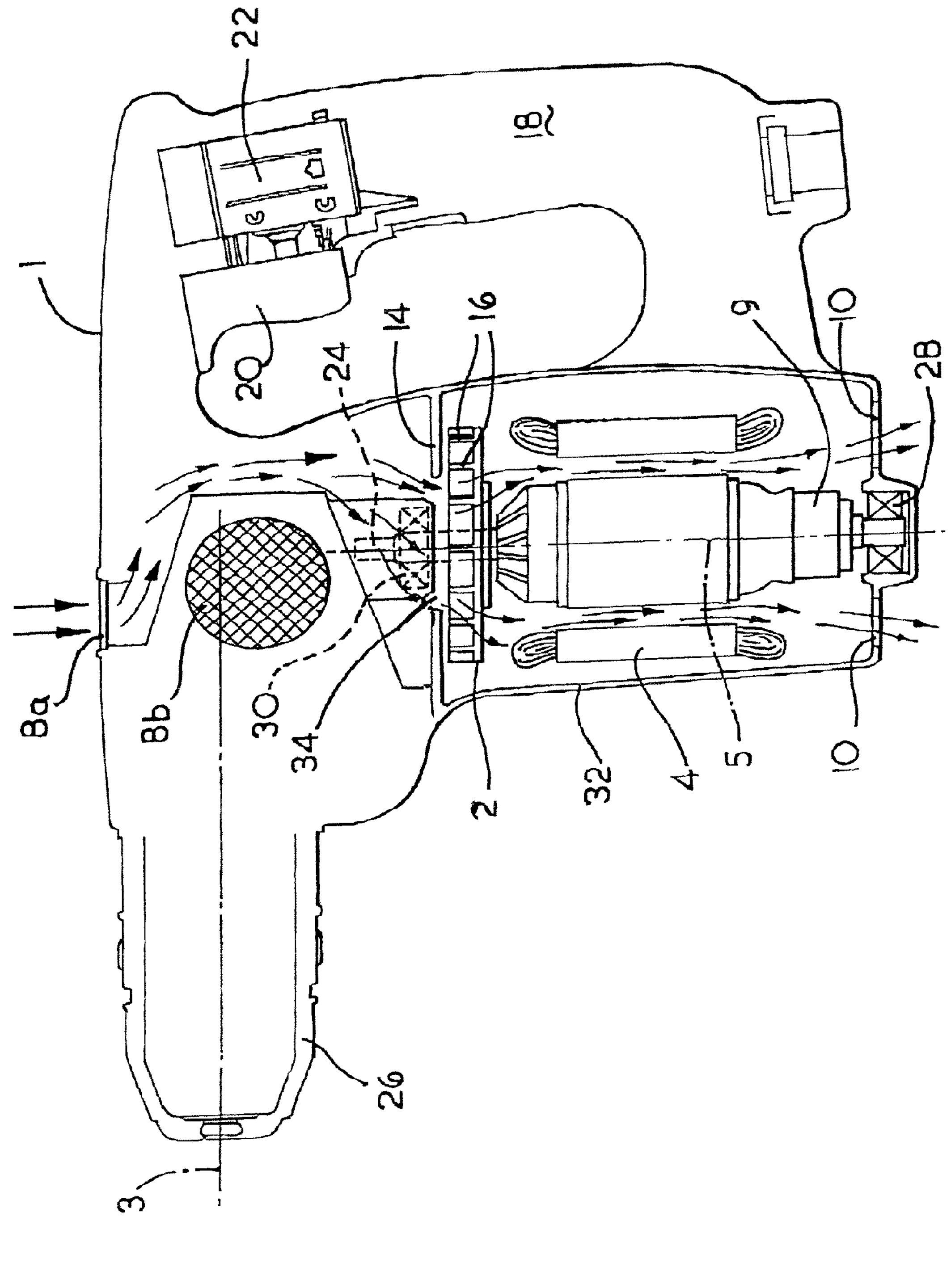
22
18
1
20
16
14
9
10
24
28
8a
8b
30
34
2
32
4
5
10
26
3

METHOD OF ASSEMBLING A DRILLING AND/OR HAMMERING TOOL

This application is a divisional of U.S. application Ser. No. 10/359,423, filed Feb. 6, 2003.

The present invention relates to hand held drilling and/or hammering tools powered by an electric motor. In particular the present invention relates to such tools in which the longitudinal axis of the motor is at an angle, generally substantially perpendicular, to the longitudinal axis of a drilling and/or hammering spindle of the tool.

Such tools mostly require the motor to be cooled by some means. Generally an airflow is generated by a fan mounted on the armature of the tool. When the armature of the motor rotates the fan is rotationally driven to generate an airflow. A casing of the motor is generally formed with an opening at the end of the motor remote from the fan, through which air can enter. Thus, when the fan rotates it pulls air into the opening and over the motor components. This air is then pulled into the fan and expelled by the fan and exits the motor casing via air outlets adjacent the fan. The type of fans used can be axial or radial fans, although radial fans are preferred due to the higher pressure they can generate. It is desirable that the motor cooling airflow is not expelled from the tool housing in an area of the tool housing, which, during use of the tool, may be directed towards the face of the user of the tool. This is because dust may be entrained in the airflow expelled from the tool housing.

For efficient running of the motor and improved lifetime of the motor it is preferred that the fan is fitted to the armature of the motor, before the motor sub-assembly is balanced. The balancing process ensures that the mass of the motor sub-assembly components is distributed evenly about the longitudinal axis of the motor. If conventional motor manufacturing plant is used, this means that the fan has to be fitted to the end of the motor remote from the commutator end of the motor. If the fan is located at the commutator end of the motor then it cannot be fitted before the motor is balanced, using conventional motor manufacturing equipment.

In so-called L-shaped drilling and/or hammering tools in which the motor is at an angle (generally perpendicular) to the axis of the drilling and or hammering spindle, the commutator end of the motor is the end located remote from the spindle. Thus, in L-shaped hammers, for the fan to be balanced, it must be located at the end of the motor adjacent to the spindle. This means that the motor cooling air is pulled into the motor at its end remote from the spindle and expelled from the motor at its end adjacent to the spindle. Expelling the motor cooling air flow from the spindle region of the tool is likely to lead to air being directed towards the face of a user of the tool during use of the tool.

This problem has been overcome in the past by locating a radial fan at the end of the motor adjacent to the commutator, after the motor sub-assembly has been balanced. This generates an airflow, which is expelled from the motor housing adjacent to the end of the motor remote from the spindle. Expelling air from this part of the tool housing directs the air away from the user's face in practically all-working positions of the tool. However, without balancing the average lifetime of the motor is reduced.

The aim of the present invention is to provide an L-shaped hammering and/or drilling tool with a balanced motor and fan assembly, using conventional motor manufacturing plant, in which a motor cooling airflow is efficiently generated and is expelled in a region of the tool not directed towards a user's face.

According to a first aspect of the present invention there is provided a hand held electrically powered drilling and/or hammering tool, having a tool housing and comprising:

a drilling and/or hammering spindle mounted within the housing, the spindle having a forward end at which a tool or bit may be mounted;

a balanced motor sub-assembly including a motor and a radial fan, the fan having a plurality of blades located on one side of the fan, and being non-rotatably mounted on an end of the armature of the motor at a first end of the motor, with the blades facing away from the armature of the motor, and the sub-assembly is mounted within the housing with the longitudinal axis of the motor armature shaft at an angle, to the longitudinal axis of the spindle and with the first end of the motor closest to the spindle axis; and air inlets located in the housing so as to communicate with an inlet to the fan and air outlets located in the housing in the region of a second commutator end of the motor opposite to the first end so as to communicate, via channels through the motor, with an outlet of the fan; and the above components are arranged so that in use of the tool the fan rotates at the first end of the motor to draw air into its inlet via the air inlets in the housing and so as to push air from its outlet along the channels through the motor and out of the air outlets in the housing in the region of the second commutator end of the motor which is remote from the spindle axis.

By orienting a radial fan with its blades facing away from the armature, the fan can be located at the non-commutator end of the motor, adjacent the spindle and so can be balanced as part of a motor sub-assembly. The fan acts to push air through the motor and so can still provide efficient cooling of the motor. The air exhausted from the fan outlet is pushed along channels through the motor, to cool the motor, and is exhausted at the end of the motor remote from the spindle, where it is unlikely to be directed towards the face of a user of the tool in normal working positions of the tool.

The longitudinal axis of the armature shaft may be arranged at an angle of between 40° and 140° to the longitudinal axis of the spindle, and is preferably arranged substantially perpendicular to the longitudinal axis of the spindle. The longitudinal axes of the armature shaft and the spindle preferably lie in the same plane.

The motor sub-assembly can additionally comprise two bearings which are mounted on the armature shaft of the motor, with one at each end of the armature shaft, and the fan is located between the two bearings. This enables the balanced sub-assembly to be mounted within the housing via the two bearings.

According to a second aspect of the present invention there is provided a method of assembling a hand held electrically powered drilling and/or hammering tool having a tool housing and a drilling and/or hammering spindle mounted within the housing, which spindle has a forward end at which a tool or bit may be mounted; comprising the steps of:

making a motor sub-assembly including a motor and a radial fan, the fan having a plurality of blades located on one side of the fan and non-rotatably mounting the fan on an end of the armature of the motor at a first end of the motor with the blades facing away from the armature of the motor;

balancing the motor sub-assembly;

mounting the sub-assembly within the housing, with the longitudinal axis of the motor armature shaft at an angle, to the longitudinal axis of the spindle and with the first end of the motor closest to the spindle axis, so that in use of the tool the fan rotates at the first end of the motor to draw air into its inlet via air inlets in the housing and so as to push air through the motor and out of air outlets in the housing in the region of the second commutator end of the motor which is remote from the spindle axis.

The longitudinal axis of the armature shaft may be arranged at an angle of between 40° and 140° to the longitudinal axis of the spindle, and is preferably arranged substantially perpendicular to the longitudinal axis of the spindle. The longitudinal axes of the armature shaft and the spindle preferably lie in the same plane.

A drilling and/or hammering tool according to the present invention will now be described by way of example, with reference to the accompanying drawing in which:

FIG. 1 shows a partially cut away cross section of a hammer according to the present invention.

The hand held electrically powered L-shaped hammer shown in the Figure has an electric motor (4), which is aligned with its longitudinal axis (5) perpendicular to the longitudinal axis (3) of the spindle (not shown) of the hammer. The longitudinal axes of the armature and the spindle lie in the same plane, i.e. the plane of the paper. The commutator (9) of the motor (4) is located at the end of the motor remote from the spindle axis (3). A tool holder (26) is located at the forward end of the spindle. A tool or bit can be non-rotatably and releasably fitted within the tool holder so as to allow limited reciprocation of the tool or bit with respect to the tool holder. The hammer has a rear handle (18) in which an on/off trigger (20) is located for actuating a switch (22) for actuating power supply to the motor (4). The armature of the motor has a pinion (24) at its end adjacent to the spindle axis (3), which mates with a gear arrangement via which a rotary drive is converted to a reciprocating drive of an air cushion hammering mechanism, as is known in the art, for generating repeated impacts on the rearward end of the tool or bit. The gear arrangement may optionally transmit a rotary drive to the spindle and thereby to the tool or bit mounted within the spindle, as is known in the art. The gear arrangement is housed in a metal gearbox (not shown).

The hammer has a housing (1) in which air inlets (8*a*, 8*b*) are provided. A first set of air inlets (8*a*) is provided in the upper part of the hammer housing above the spindle and a second set of air inlets (8*b*) is provided in the side of the hammer housing to the side of the spindle.

A motor sub-assembly is made by non-rotatably mounting a radial fan (2) onto the armature of the motor (4), at a first end of the motor remote from the commutator (9). The sub-assembly also comprises two bearings (28, 30), one located at each end of the armature shaft, so that the fan (2) is located between the bearings (28, 30). The fan (2) has a plurality of blades (16) on one side and is mounted on the armature shaft with the plurality of blades (16) facing away from the armature of the motor and facing towards the spindle axis (3). The sub-assembly, comprising the motor (4), fan (2) and bearings (28, 30) is then balanced to ensure that the mass of the sub-assembly is evenly distributed about the longitudinal axis (5) of the motor. The motor sub-assembly is then mounted within a motor housing (32) of the hammer via the two bearings (28, 30). The motor housing has a circular opening (34) formed in its end facing towards the spindle axis (3), which cooperates with the blades of the fan (16) to form an annular air inlet to the fan. A part of the motor housing (14) surrounding the opening (34) cooperates with the blades (16) to form a volute for the fan (2). The motor housing (32) has air outlets (10) formed in its second commutator end facing away from the spindle axis (3). In use of the hammer, the outlets (10) are unlikely to be directed towards a user's face for normal operating positions of the hammer.

When the hammer is actuated via the trigger (20) the motor (4) rotatingly drives the fan (2). The fan (2) pulls air through the air inlets (8*a*, 8*b*) in the hammer housing (1). The air from the inlets (8*a*,8*b*) is pulled over the gearbox in order to cool the gearbox before being drawn through the inlet (34) to the radial fan (2). The air drawn into the fan (2) is urged radially outwardly guided by the plurality of blades (16). This movement of air generates an over pressure in the motor housing (32) which pushes the air exhausted by the fan (2) along channels through the motor (4) and out of the air outlets (10). The airflow thus created over the motor (4) effectively cools the motor during operation of the hammer.

The invention claimed is:

1. A method of assembling a hand held electrically powered drilling and/or hammering tool having a tool housing and a spindle mounted within the housing; comprising the steps of:

making a motor sub-assembly including a motor, an armature shaft and a radial fan, the fan having a plurality of blades, and mounting the fan on an end of the armature shaft at a first end of the motor with the blades facing away from the motor; balancing the motor sub-assembly;

mounting the sub-assembly within the housing, with the longitudinal axis of the armature shaft at an angle to the longitudinal axis of the spindle and with the first end of the motor closest to the spindle axis, on that in use of the tool the fan rotates at the first end of the motor to draw air into the housing, push air through the motor and out of the housing proximate to a second end of the motor, which second end of the motor is remote from the spindle axis and proximate to a commutator.

2. The method according to claim 1 further including mounting the sub-assembly in the tool housing with the longitudinal axis of the armature shaft at an angle of between 40.degree. and 140.degree. to the longitudinal axis of the spindle.

3. The method according to claim 1 wherein the sub-assembly is mounted in the tool housing with the longitudinal axis of the armature shaft substantially perpendicular to the longitudinal axis of the spindle.

4. The method according to claim 1 wherein the step of making the sub-assembly comprises the step of mounting two bearings on the armature shaft, with one at each end of the armature shaft, and locating the fan between the two bearings.

5. The method according to claim 4 wherein the sub-assembly is mounted within the housing via the two bearings.

6. The method according to claim 1 wherein a part of the housing adjacent the blades of the fan defines an inlet for the fan.

* * * * *